J. LAWRENCE AND O. C. WHITTON.
AUTO BODY.
APPLICATION FILED FEB. 20, 1918.
1,316,488.
Patented Sept. 16, 1919.
2 SHEETS—SHEET 1.
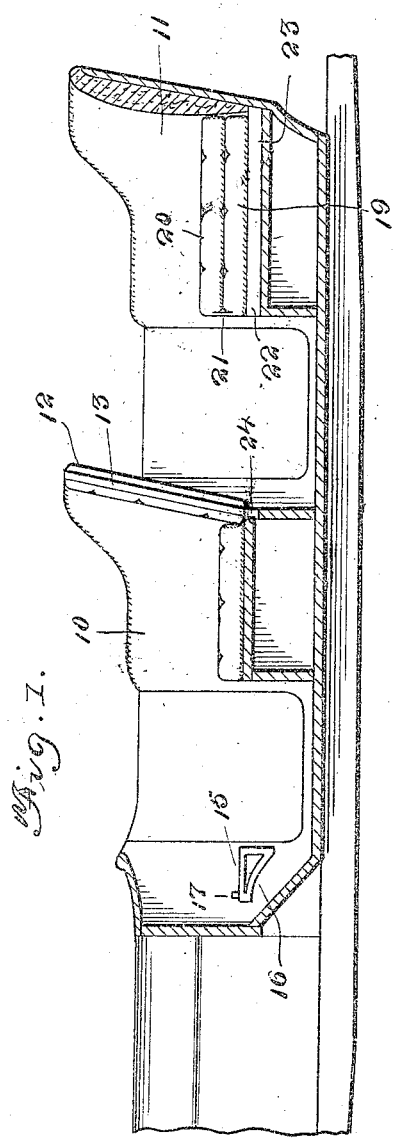
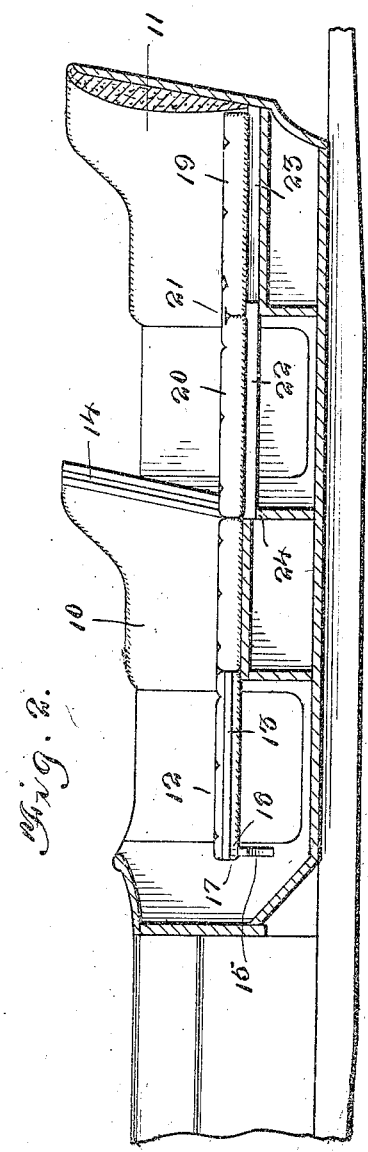
Witnesses
E. R. Ruppert
Inventors
John Lawrence
Orvil C. Whitton
By Victor J. Evans
Attorney J. LAWRENCE AND O. C. WHITTON.
AUTO BODY.
APPLICATION FILED FEB. 20, 1918.
1,316,488.
Patented Sept. 16, 1919.
2 SHEETS—SHEET 2.
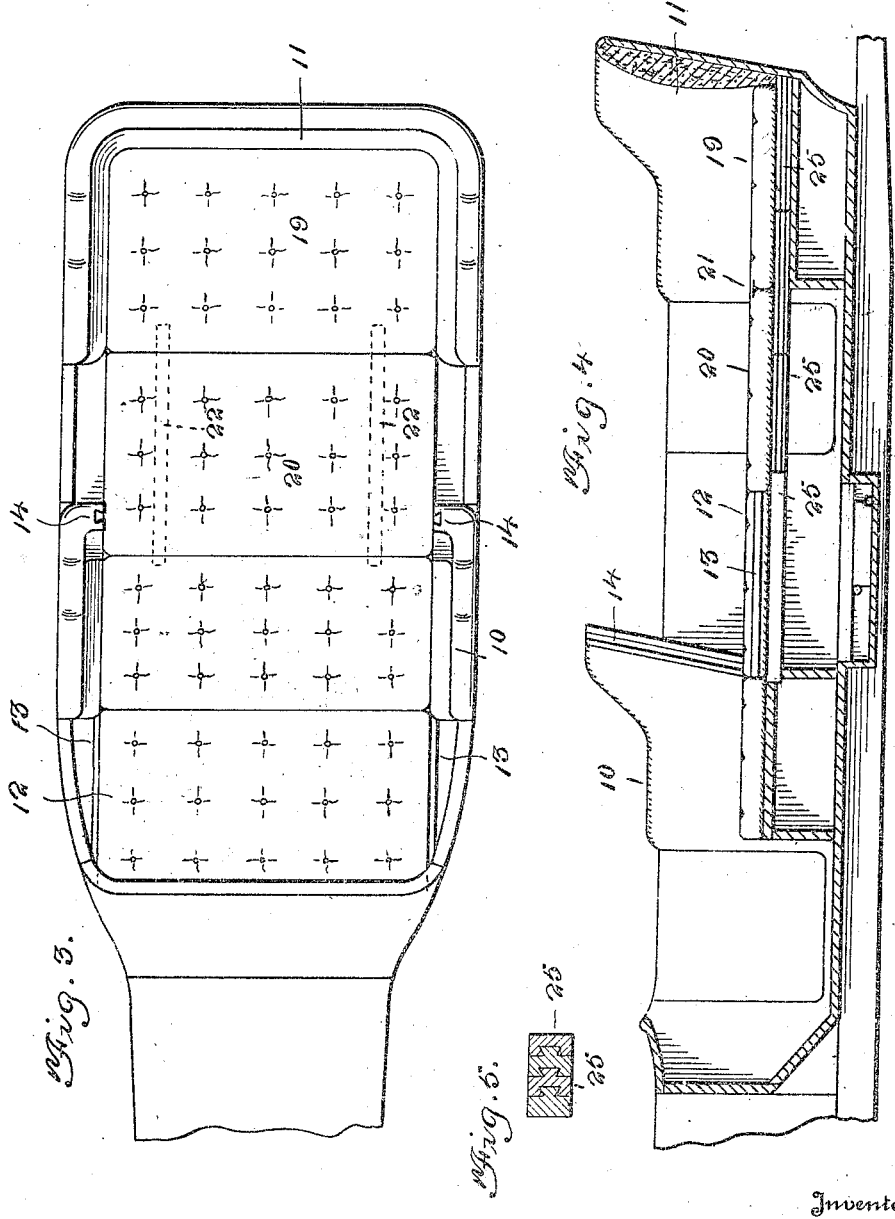
Witnesses
E. R. Ruppert.
Inventors
John Lawrence
Orvil C. Whitton
By Victor J. Evans
Attorney

UNITED STATES PATENT OFFICE.

JOHN LAWRENCE, OF SAMFORDYCE, AND ORVIL C. WHITTON, OF RIOGRANDE, TEXAS.

AUTO-BODY.

1,316,488.      Specification of Letters Patent.      Patented Sept. 16, 1919.

Application filed February 20, 1918. Serial No. 218,378.

*To all whom it may concern:*

Be it known that we, JOHN LAWRENCE and ORVIL C. WHITTON, citizens of the United States, residing at Samfordyce and Riogrande, in the counties of Hidalgo and Starr and State of Texas, have invented new and useful Improvements in Auto-Bodies, of which the following is a specification.

This invention relates to improvements in vehicle bodies and aims to provide means for converting a motor vehicle body of the touring type into a convenient and comfortable bed.

The invention comprehends the provision of a double or foldable cushion for the rear seat, which may be extended to a position between the front and rear seats in horizontal alinement therewith and a removable back for the front seat, so that the cushion will form a practically unbroken surface, provision being made for supporting the back of the front seat in horizontal alinement to further lengthen the surface and provide a comfortable bed.

The invention also resides in the novel form of supporting the back of the front seat and the extended section of the rear seat cushion, the former including pivoted brackets secured upon the side walls of the vehicle and the latter rods, which are slidably mounted beneath the rear seat and engageable with the back of the front seat.

In the drawings:

Figure 1 is a longitudinal sectional view through the body of a motor vehicle of the five passenger type, the cushions being arranged in the manner ordinarily used in touring;

Fig. 2 is a similar view with the cushions arranged as a bed;

Fig. 3 is a plan view with the cushion in a position shown in Fig. 2;

Fig. 4 is a view similar to Fig. 2 showing the arrangement of the cushions in a seven passenger vehicle; and Fig. 5 is a cross sectional view through the extensible bar used for supporting the cushions when arranged, as shown in Fig. 4.

Referring to Figs. 1 to 3 of the drawings, there is illustrated a vehicle body of the five passenger type, the front seat of which is shown at 10 and the rear seat at 11. These seats are arranged in the usual manner and when the vehicle is used for touring, their appearance is similar to that of the usual cars of this type.

It is the object of the invention however to quickly and conveniently convert the vehicle into a sleeping compartment or bed and for this purpose the front seat is provided with a removable back section 17, each side edge of which is provided with a tongue 13, which is adapted to engage a groove 14 formed in each side of the seat 10. This tongue and groove is preferably of dove-tail formation so as to more securely hold the back section 12 in position.

The section 12 is adapted to be removably placed in front of the front edge of the cushion of the seat 10, and when in this position its top surface will be in alinement with the top surface of the said cushion. For the purpose of supporting the section 12 in this position brackets 15 are hingedly secured upon the opposite side walls of the vehicle body in a manner to permit of their being swung out of the way when not in use. These brackets are provided with upstanding studs 17, each of which is adapted to engage an opening 18 formed in the rear wall of the back of the front seat.

The seat cushion of the rear seat 11 is formed of two sections 19 and 20, which are joined together along their edges as shown at 21, enabling the section 20 to be folded upon the section 19 when used as a seat. When used as a bed the section 20 is swung outward to occupy the intervening space between the front and rear seats and is held in horizontal alinement with said seats by means of rods 22, which are slidable in grooves 23 beneath the rear seat and are adapted to have their outer ends engaged in notches 24 provided in the back of the front seat 10.

When the cushions are arranged as shown in Fig. 1, they provide the ordinary seats of a vehicle of this type, while when arranged as shown in Figs. 2 and 3 they form a convenient and comfortable bed, the means provided for supporting the cushions in the latter position requiring the minimum amount of time and labor for their adjustment.

In the form of the invention shown in Fig. 4 the extra space between the front and rear seats in the car of the seven passenger type is provided for by arranging the back section 12 of the front seat between the section 20 of the rear seat cushion and the back of the front seat as shown. For this purpose extensible rods 25 are substituted for the rods 22. These rods 25 may be of any suitable construction, but it is preferred that they be constructed after the manner of the extension bars of a table, the cross section of which is shown in Fig. 5. It is not the purpose of the invention however to limit the bars to this particular construction, as other forms equally well adapted for the purpose may be substituted.

Having described the invention, what is claimed is:—

A vehicle provided with spaced alined front and rear seats, a removable back for the front seat, means for supporting said back in horizontal alinement with the front seat, a double cushion for the rear seat, the two parts of said cushion being connected along one longitudinal edge to permit of one part being swung outwardly to a position between the front and rear seats and rods slidable beneath the rear seat and engageable with notches in the base of the front seat to support the outwardly swung portion of the cushion.

In testimony whereof we affix our signatures.

JOHN LAWRENCE.
ORVIL C. WHITTON.